(12) United States Patent
Medalion et al.

(10) Patent No.: US 11,893,608 B2
(45) Date of Patent: Feb. 6, 2024

(54) SYSTEM AND METHOD PROVIDING BUSINESS INSIGHTS BASED ON CLUSTER SUCCESS ANALYTICS FOR PRODUCTS BASED BUSINESSES

(71) Applicant: Intuit Inc., Mountain View, CA (US)

(72) Inventors: Shlomi Medalion, Tel Aviv (IL); Yair Horesh, Tel Aviv (IL); Yehezkel Shraga Resheff, Tel Aviv (IL); Sigalit Bechler, Tel Aviv (IL); Oren Sar Shalom, Tel Aviv (IL); Daniel Ben David, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 1000 days.

(21) Appl. No.: 16/818,268

(22) Filed: Mar. 13, 2020

(65) Prior Publication Data

US 2021/0287261 A1 Sep. 16, 2021

(51) Int. Cl.
*G06Q 30/0282* (2023.01)
*G06Q 30/0202* (2023.01)
(Continued)

(52) U.S. Cl.
CPC ......... *G06Q 30/0282* (2013.01); *G06F 17/16* (2013.01); *G06F 18/2148* (2023.01);
(Continued)

(58) Field of Classification Search
CPC ............ G06Q 30/0282; G06Q 30/0202; G06F 40/30; G06F 18/2148; G06F 18/23; G06F 17/16; G06N 3/084
See application file for complete search history.

(56) References Cited

U.S. PATENT DOCUMENTS 9,665,628 B1 * 5/2017 Dubey .................... G06N 7/01
2005/0108081 A1 * 5/2005 Loe ........................ G06Q 10/10
705/348

(Continued)

FOREIGN PATENT DOCUMENTS

CN 106980988 A * 7/2017 ......... G06Q 30/0201

OTHER PUBLICATIONS

Berger et al. "Uniting the Tribest: Using Text for Marketing Insight" (2020) (https://journals.sagepub.com/doi/epub/10.1177/0022242919873106) (Year: 2020).*

*Primary Examiner* — Sujay Koneru
(74) *Attorney, Agent, or Firm* — DLA PIPER LLP (US)

(57) ABSTRACT

A method may be used to predict a business' category by analyzing the business' vendors. A neural network architecture may be trained via supervised learning to predict categories for businesses based on listed vendors. The neural network may be used to classify uncategorized businesses within an accounting software database. A list of factors associated with a business' success may be generated by analyzing, aggregating and ranking factors determined to be relevant to a business based on its categorization. The factors associated with the business' success may be related to the products and/or services offered by the business and the format of which those products and/or services are offered by the business. The factors may also be related to the products and/or services purchased by the business from a vendor and the format of which those products and/or services are purchased from the vendor.

25 Claims, 11 Drawing Sheets

(51) Int. Cl.
    *G06F 40/30*     (2020.01)
    *G06F 18/23*     (2023.01)
    *G06F 17/16*     (2006.01)
    *G06N 3/084*     (2023.01)
    *G06F 18/214*     (2023.01)

(52) U.S. Cl.
    CPC .............. *G06F 18/23* (2023.01); *G06F 40/30* (2020.01); *G06N 3/084* (2013.01); *G06Q 30/0202* (2013.01)

(56) References Cited

U.S. PATENT DOCUMENTS

| | | | | |
|---|---|---|---|---|
| 2006/0015365 | A1* | 1/2006 | Stofko | G06Q 30/00 |
| | | | | 705/26.1 |
| 2016/0140519 | A1* | 5/2016 | Trepca | G06N 7/01 |
| | | | | 705/26.44 |
| 2017/0031996 | A1* | 2/2017 | Priness | G06F 16/248 |
| 2018/0060437 | A1* | 3/2018 | Gao | G06F 16/951 |
| 2019/0179889 | A1* | 6/2019 | Ferguson | G06Q 10/105 |
| 2019/0347327 | A1* | 11/2019 | Patil | G06F 16/951 |
| 2020/0019611 | A1* | 1/2020 | Tutubalina | G06F 40/30 |
| 2020/0081964 | A1* | 3/2020 | Maneriker | G06F 40/103 |
| 2020/0184017 | A1* | 6/2020 | Batra | G06F 16/95 |
| 2020/0226646 | A1* | 7/2020 | Awoyemi | G06N 20/00 |
| 2021/0182659 | A1* | 6/2021 | Makhija | G06V 30/147 |

\* cited by examiner

SYSTEM AND METHOD PROVIDING BUSINESS INSIGHTS BASED ON CLUSTER SUCCESS ANALYTICS FOR PRODUCTS BASED BUSINESSES

BACKGROUND OF THE DISCLOSURE

There are many different applications, such as accounting software or other business management software, that have a large user base of businesses and thus large databases of business information. It is relatively common for these databases to not contain enough information about each business to allow significant or effective analysis of the database and the businesses within them. They may have lacking, incorrect, or misleading knowledge on the industry, category, or services/products offered by the business. Sometimes, the data may be stored in a format that is not structured or useful.

Many businesses do not select a category and/or description for their business when registering to use software or participate in an organization. A selected category can be helpful, but categories by themselves are quite broad and cannot offer extensive insight due to the extensive variety in business operations. Typically, a database will offer a small number of possible categories, e.g., sixteen categories. Examples of categories may be "Educational Services", Wholesale Trade", "Finance and Insurance", "Manufacturing", "Healthcare and Social Assistance", and the like. In addition, databases also contain a description for each business, which is similarly left blank much of the time. But even when a description is provided, the allowance of free-form text can give rise to much inconsistency. For example, three different businesses within a database may have the following descriptions: "cleaning and maintenance", "janitorial services", and "cleaning, maintenance, and janitorial services." Common sense may suggest that these businesses are similar, but from the point of view of an automated system, such businesses are considered different, which adds unnecessary inconsistency.

In addition, it is difficult to summarize the services or products offered by a business, despite databases typically having access to the business' invoices and bank transactions. Obtaining accurate and appropriate lists of business offerings (e.g., services and/or products) requires manual entry or adherence to a pre-defined list when selecting offerings.

Due to these issues, it is often difficult to truly understand the nature of businesses and their operations from a database or in a software environment. This lack of understanding can limit the ability to suggest new products or services to businesses or provide recommendations based on the performance of similar businesses.

DETAILED DESCRIPTION OF SEVERAL EMBODIMENTS

Figure 1:
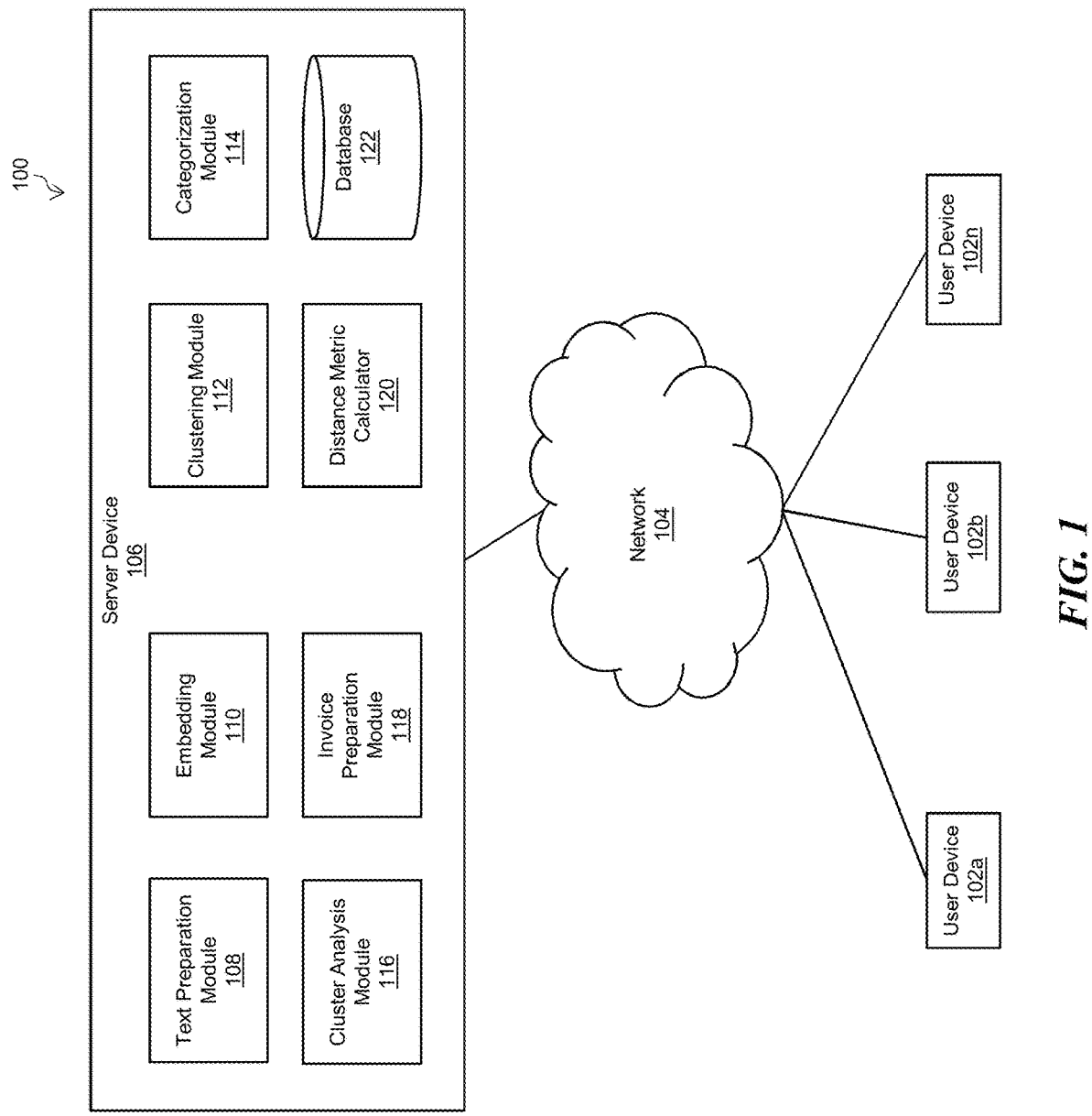
FIG. 1 is a block diagram of an example system for business categorization and service recommendation, according to an embodiment of the present disclosure.

Embodiments of the present disclosure relate to various systems and methods that may predict a business' category based e.g., on a given business description or an associated vendor. For example, in some types of accounting software, only a portion of the users (e.g., businesses) supply both a category and a description of the business. Many users supply only one of the two, and some users do not supply either. A method may be used to train a neural network architecture via supervised learning to predict missing categories for businesses based on their given description. The network may be trained using existing businesses that have provided both descriptions and categories. Another method of the present disclosure may use the trained neural network to classify new businesses or users (e.g., when signing up for software services), store the classifications within a database, and/or display the classification to the new business or user for confirmation. For example, a new business may provide a description of "cleaning, maintenance, and janitorial services" when registering with accounting software and the method may categorize this business as "administrative and support and waste management and remediation services."

According to another embodiment of the present disclosure, a method may be used to predict a business' category by analyzing the business' vendors. For example, accounting software may have access to the business' vendors. The disclosed principles may train a neural network architecture via supervised learning to predict categories for businesses based on listed vendors. Information related to the business' vendors may also include vendor description or invoice lines (e.g., numbered purchase orders and corresponding descriptions such as products and/or services, prices, locations, etc.) and other related information, such as bank transactions. Another method disclosed herein may use the neural network to classify uncategorized businesses within an accounting software database. For example, the method may analyze the contents of a business' vendor listing, identify line items (e.g., "coffee beans; $3,000;" "coffee cups; $700;" and "pastries; $1,000;"), and classify the business as "coffee and food retail."

According to another embodiment of the present disclosure, a method may be used to generate a list of factors associated with a business' success. The factors may be generated by analyzing, aggregating and ranking factors determined to be relevant to a business based on its categorization. The factors associated with the business' success may be related to the products and/or services offered by the business and the format of which those products and/or services are offered by the business. The factors may also be related to the products and/or services purchased by the business from a vendor and the format of which those products and/or services are purchased from the vendor.

The method may analyze the vendor offerings, identify the associated clusters, and generate a bounded list of purchases for that business. For example, a pre-defined list of purchase orders that a dry-cleaning business may select from within accounting software may include "hanger and accessories" and "pressing accessories." The method of the present disclosure may analyze the dry-cleaning business' purchases and identify associated clusters (e.g., formed by analyzing other dry cleaning services' purchases) with more specialized descriptions such as "plastic bags," "irons," and "press pads."

According to another embodiment of the present disclosure, a method may be used to standardize and provide consistency across a database of factors associated with a business' success. The business factors may be related to the products and/or services offered by the business and the format of which those products and/or services are offered by the business. The business factors may also be related to the products and/or services purchased by the business from the vendor and the format of which those products and/or services are purchased from the vendor. A method of the present disclosure may use clustering techniques and language processing techniques to cluster or group business factors together that are similar and generate a representative description for each cluster. In general, a cluster may be a group of vectors or points within a certain pre-defined distance or radius. This business factor may then be associated with the businesses within that cluster, allowing for greater consistency and ease of identification of similar businesses within a software environment. The generated list of business factors can be forwarded to a business within the cluster that fails to exhibit any of the listed factors.

The embodiments described herein may improve the technical functioning of computer data storage systems. For example, some embodiments may reduce the amount of data required to be stored by consolidating portions of the data having similar meanings. Some embodiments may also improve data storage system functionality by improving data search speed and accuracy due to improved classification of data within the storage system.

FIG. 1 is a block diagram of an example system 100 for aggregating a database of businesses, according to an embodiment of the present disclosure. System 100 may include a plurality of user devices 102a, 102b, . . . , 102n (102 generally) and a server device 106, all of which may be communicably coupled via network 104. In some embodiments, system 100 may include any number of user devices. For example, for an organization that manages accounting software and an associated database, there may be an extensive user base with thousands or even millions of users that may connect via respective user devices. Server device 106 may be configured to selectively send a variety of information, such as product or service recommendations or business categorizations, to multiple or single user devices.

A user device 102 can include one or more computing devices capable of receiving user input as well as transmitting and/or receiving data via network 104 or communicating with server device 106. In some embodiments, a user device 102 can include a conventional computer system, such as a desktop or laptop computer. Alternatively, a user device 102 may include a device having computer functionality, such as a personal digital assistant (PDA), a mobile telephone, a smartphone, or other suitable device. In some embodiments, a user device 102 may be the same as or similar to user device 1100 described below with respect to FIG. 11.

Network 104 may include one or more wide areas networks (WANs), metropolitan area networks (MANs), local area networks (LANs), personal area networks (PANs), or any combination of these networks. Network 106 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 104 can also use standard communication technologies and/or protocols.

As shown in FIG. 1, server device 106 may include text preparation module 108, embedding module 110, clustering module 112, categorization module 114, cluster analysis module 116, invoice preparation module 118, relation metric calculator 120, and a database 122. Server device 106 may be configured to receive business descriptions, invoices, category selections, and vendor information from user devices 102. In some embodiments, server device 106 may be configured to obtain vendor information for users by contacting a financial services network (not shown). For example, a user may grant permission to server device 106 to utilize login credentials for a bank to monitor a bank account associated with a business. In some embodiments, server device 106 may be configured to extract information for bank transactions including, but not limited to, recipient, date, location, amount, etc. In some embodiments, server device 106 may be configured to store the vendor information, bank transaction information, invoices, business descriptions, category selections, and any other relevant information related to each business and/or user in database 122. The vendor information may be stored in a list of vendors, as described in detail with respect to FIG. 2.

Businesses may be classified and categorized based on a business description. For example, the text preparation module 108 may be configured to clean up business descriptions or invoice text. Text preparation module 108 may be configured to remove stop words, perform lemmatization processes, and calculate term frequency-inverse document frequency values. For example, stop words may be identified using a pre-defined list of stop words.

Embedding module 110 may be configured to embed text to vector form within a continuous vector space. In some embodiments, embedding module 110 may convert business-related text into a merchant vector within a continuous vector space. In some embodiments, a word2vec model may be used to convert text to the vector space. The word2vec model may be pre-trained. In some embodiments, each business description may be converted to a three hundred-dimensional merchant vector. The word2vec model may use a continuous bag-of-words approach (CBOW). The word2vec model may be configured to create a "bag-of-words" for each business description. A bag-of-words for a business description may be a set (e.g., JSON object) that includes every word in the business description and the associated multiplicity (e.g., the number of times the word appears in the business description) of each word. The word2vec model may be configured to predict a merchant vector representation of each word using the context of the word's usage in the business description. For example, the word2vec model may consider the surrounding words and the multiplicities, but may not use grammar or the order of the words in the business description. Embedding module 110 may be configured to compile the vector representations of each word in a description to create a three hundred-dimensional merchant vector representing the business description.

In some embodiments, this processing may include averaging the vectors of every word in the business description to generate a representative merchant vector. In some embodiments, this may include generating a matrix, where each column is a merchant vector corresponding to a word in the description. The vector may include any number of entries (e.g., fifty, two hundred, or five hundred). In some embodiments, embedding module 110 may be tunable. The parameters used to create vector representations may be variable and may be adjusted or tuned based on learning. In some embodiments, embedding module 110 may include an encoder and/or a neural network architecture to perform the embedding processes. The embedding module 110 may similarly convert invoice-related text into a vendor vector within a continuous vendor vector space. In some embodiments, a word2vec model may similarly be used to embed text to the vector space, as described above.

In some embodiments, embedding module 110 may use a word2vec model with a skip-gram approach, where a skip-gram approach predicts a focus word within a phrase or sentence. The pre-trained word vectors may be initially trained on a variety of sources, such as Google News and Wikipedia. In some embodiments, embedding module 110 may employ other word embedding frameworks such as e.g., GloVe (Global Vector) or FastText. GloVe techniques may embed words such that the dot product of two word vectors is close to or equal to the log of the number of times they appear near each other (rather than predicting neighboring words (CBOW) or predicting the focus word (skip-gram)). In some embodiments, for each term or word in a sentence or phrase (e.g., a line item of an invoice), embedding module 110 may attach the relevant word-vector, meaning a phrase may initially consist of a sequence of word-vectors.

Businesses may also be classified and categorized by analyzing the businesses' vendors. For example, the clustering module 112 may be configured to generate clusters of merchant vectors within a vector space. In some embodiments, clustering module 112 may also generate common vendor vectors based on clusters of invoice vectors. In some embodiments, clustering module 112 may apply a mean-shift clustering algorithm to cluster the merchant vectors. Mean-shift clustering algorithms may place a weighing function/kernel at each point in the vector space, where each weighing function/kernel has an associated bandwidth parameter. Adding up every kernel may generate a probability surface. The mean-shift algorithm may iteratively shift each kernel to a higher density region in the vector space until it achieves convergence. When convergence is reached, all points or vectors that reside within the cluster are then associated with that cluster. Any number of clusters may be generated in the vector space. Because the clustering module 112 is generating clusters of merchant vectors that have been mapped from vendor association, it can recognize that similar merchant vectors (and thus similar merchants) should be in the same cluster. In some embodiments, clustering module 112 may use hierarchical clustering analysis to generate a hierarchy of clusters.

In some embodiments, clustering module 112 may be operable to implement a variety of clustering techniques, such as k-means, affinity propagation, spectral clustering, hierarchical clustering, density-based spatial cluster of applications with noise (DBSCAN), OPTICS, Gaussian mixture modeling, or Birch. For example, k-means clustering techniques may separate samples into a pre-defined number of groups of equal variance. For a k-means algorithm, the centroids of each cluster (e.g., the central point of each business category in the vector space) is chosen ahead of time. The algorithm may assign each sample (e.g., each merchant vector or vendor vector) to its nearest centroid, create new centroids/categories by taking the mean value of all the samples, and compute the differences between the old and new centroids. The algorithm may repeat these steps until the difference value is below a certain pre-defined threshold.

Categorization module 114 may be configured to determine a vendor using a trained supervised learning model (e.g., mapping an input to an output based on example input-output pairs provided to the network). In some embodiments, categorization module 114 may include a neural network architecture trained to predict business categories or descriptions. In some embodiments, categorization module 114 may be trained to predict categories based on descriptions or invoices. Cluster analysis module 116 may be configured to analyze a cluster (e.g., a cluster generated by clustering module 112) and generate a description of text representing the cluster. In some embodiments, this description may be in natural language or normal text format, and not in vector format. In some embodiments, generating a description that represents each cluster may include combining up to three original descriptions (prior to any processing) that contain a certain, pre-defined amount of the words with the highest TFIDF values, such as those calculated by text preparation module 108. For example, cluster analysis module 116 may, based on the vectors within a generated cluster, obtain the merchants associated with each vendor vector. In some embodiments, cluster analysis module 116 may combine fewer or more than three merchants to generate the representative description. The phrase or group of merchants resulting from the combined descriptions may be used as a description for the associated cluster. The representative merchants may also be assigned to every vendor with an associated description vector within the cluster. In some embodiments, the representative description of the merchants may replace the user provided description associated with each merchant in the database 122. In some embodiments, cluster analysis module 116 may be configured to determine and assign one or more clusters to a vendor vector and compile all associated cluster descriptions into a list of vendors.

Invoice preparation module 118 may be configured to extract text from invoices. In some embodiments, invoice preparation module 118 may be configured to use optical character recognition (OCR) to extract text from invoice files (e.g., PDFs, Word Documents, etc.) or images (e.g., PNG, JPEG, etc.). Invoice files or images may be stored in database 122. In some embodiments, invoice preparation module 118 may be configured to generate a representative vector of a vendor based on a plurality of vectors describing line items of the invoice. For example, generating a representative vector for Business A may include analysis and processing of the plurality of vectors for each line item of each invoice of Business A. Invoice preparation module 118 may combine words (in vector format or in the vector space) within each line item using a long short-term memory (LSTM) layer. In some embodiments, this may reduce redundancy and improve efficiency and accuracy of downstream processing. Invoice preparation module 118 may also utilize a convolutional neural network to combine line item vectors (or invoice line vectors) associated with the same vendor to create a vector representing that vendor. In some embodiments, the convolutional neural network may be configured to add or subtract the plurality of line item vectors with various weights to create a single vector representing the vendor. Invoice preparation module 118 may then combine all vectors associated with Business A to generate a vendor vector representing Business A. In some embodiments, this may include averaging every vector associated with Business A.

Distance metric calculator 120 may be configured to calculate a relation metric between two vectors. In some embodiments, relation metric calculator 120 may be configured to calculate a relation metric between a merchant vector and a vendor vector. A relation metric may represent a degree of relation between the vectors and thus the corresponding businesses. A low relation metric may correspond to a low relation between two vectors. For example, a relation metric calculated between a merchant vector for a tax service business and a vendor vector for a pool cleaning service may be low or near-zero. A relation metric calculated between a merchant vector for a Jacuzzi supplier and a vendor vector for a pool supplier may be higher, due to the improved commonalities between the merchants and vendors. A relation metric calculated between a merchant vector for a vehicle repair service and a vendor vector for an auto body shop may be higher than the previous two examples. In some embodiments, the relation metrics may be used to train a neural network to predict related/unrelated pairs of vendors and merchants. In some embodiments, the relation metric may be an inner product between the two vectors. In some embodiments, relation metric calculator 120 may be configured to apply a sigmoid function to confine the relation metric between zero and one. In some embodiments, relation metric calculator 120 may be configured to determine services related to a business. In some embodiments, this may include generating a matrix, where each column is a merchant vector corresponding to a vendor vector. The merchant vector and the vendor vector may include any number of entries (e.g., fifty, two hundred, or five hundred).

Factors related to each merchant may be received. The factors may be received from the customer, a public source, or the database 122. Once received, the factors may be analyzed, aggregated and ranked. The factors associated with the business' success may be related to the products and/or services offered by the merchant and the format of which those products and/or services are offered by the merchant. The factors may be also be related to the products and/or services purchased by the merchant from the vendor and the format of which those products and/or services are purchased from the vendor. For example, many merchants may have extensive and detailed offerings, including numerous variations of certain products or services that contribute to their superior performance. It can be difficult to account for all of these based on pre-defined options provided by accounting software. In addition, manually going through invoices to count and list all purchased products and services for an entire user base is not viable. Therefore, a method may be used to analyze the invoices of a user base, extract purchases (e.g., products and services), cluster the offerings, and generate a representative offering description for each cluster, allowing for a more standardized and comprehensive database of product and service offerings among a user base. The method may analyze the vendor offerings, identify the associated clusters, and generate a bounded list of purchases for that merchant. For example, a pre-defined list of purchase orders that a dry-cleaning business may select from within accounting software may include "hanger and accessories" and "pressing accessories." The method of the present disclosure may analyze the dry-cleaning business' purchases and identify associated clusters (e.g., formed by analyzing other dry cleaning services' purchases) with more specialized descriptions such as "plastic bags," "irons," and "press pads."

The factors associated with a merchant's success may be standardized to provide consistency across a database of factors. For example, the clustering module 112 may be configured to generate clusters of factors that are similar and generate a representative description for each cluster. In some embodiments, clustering module 112 may generate clusters of factors based on common merchant vectors. In some embodiments, clustering module 112 may apply a mean-shift clustering algorithm to cluster the business factors. As described above, mean-shift clustering algorithms may place a weighing function/kernel at each point in the vector space, where each weighing function/kernel has an associated bandwidth parameter. Adding up every kernel may generate a probability surface. The mean-shift algorithm may iteratively shift each kernel to a higher density region in the vector space until it achieves convergence. When convergence is reached, which depends on the bandwidth (the bandwidth reflects the "width" or "scope" of the cluster), all points or vectors that reside within the factor cluster are then associated with that cluster. Any number of factor clusters may be generated in the vector space. Because the clustering module 112 is generating clusters of business factor vectors that have been mapped from vendor association, it can recognize that similar factor vectors (and thus similar factors) should be in the same cluster. In some embodiments, clustering module 112 may use hierarchical clustering analysis to generate a hierarchy of business factor clusters. The generated list of business factors can be forwarded to a merchant within the merchant cluster that fails to exhibit any of the listed factors.

For example, the complete generated list of business factors associated with the merchant can be forwarded to the merchant. In alternative embodiments, the generated clusters of factors that represent the determinants of success per cluster can be forwarded to the merchant.

The various system components—such as modules 108 through 122—may be implemented using hardware and/or software configured to perform and execute the processes, steps, or other functionality in conjunction therewith.

Figure 2:
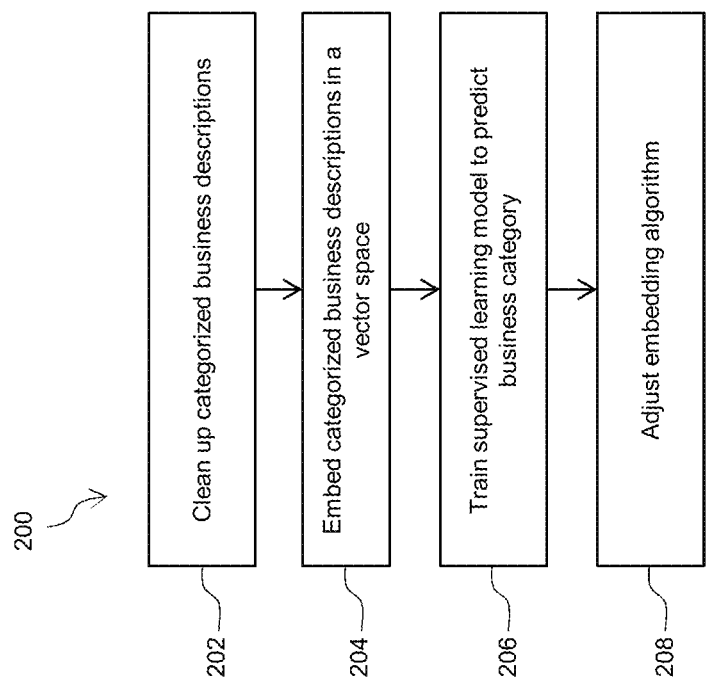
FIG. 2 is a flow diagram showing processing that may occur to train a supervised learning model to predict business categories, according to an embodiment of the present disclosure.

FIG. 2 is a flow diagram showing process 200 that may train a supervised learning model to predict business categories, according to an embodiment of the present disclosure. At block 202, text preparation module 108 may clean up categorized business descriptions. Categorized business descriptions may refer to a business description associated with a business that also has a category assigned to it. This may be in contrast to an uncategorized business description, a business description associated with a business that does not have a category specified. In some embodiments, business descriptions that are cleaned up by text preparation module 108 may be obtained from database 122. In some embodiments, cleaning up a business description may include reducing noise within the description and preparing the text of the description for processing in block 204.

At block 204, embedding module 110 may embed the cleaned up categorized business description to a vector space in a manner similar to or the same as described above. Embedding module may apply a word2vec algorithm using a CBOW approach to generate a vector representation of the cleaned up categorized business descriptions. In some embodiments, the vector representation may be a three hundred-dimensional vector. The vector representation of the description may be a single vector generated by averaging the vector representation of each word in the description. In some embodiments, the vector representation of the description may be a matrix with each column vector being a vector of a word in the description.

At block 206, a neural network contained in categorization module 114 may be trained to predict a business category using supervised learning. In some embodiments, the neural network may be a fully connected neural network. A fully connected neural network may be a neural network with multiple layers (e.g., three layers) where each neuron in a layer receives input from every element of the previous layer. In some embodiments, the layers may be responsible for the specific prediction task (e.g., category or industry prediction). The dense layers may receive vectors from the pre-trained word2vec models that are sequenced together by the LSTM layer. The layers may "move" the input vector in space to optimize the prediction task. In other words, the layers may learn which vectors belong to the same industry and embed them closer together in the vector space. Training the neural network may include providing examples of embedded business descriptions with known categories. The neural network may learn to predict the business category based on the description embedding.

At block 208, the embedding module may adjust the embedding algorithm (e.g., the parameters of the word2vec model) based on the known categories to improve its embedding abilities. In other words, embedding module 110 may continuously learn, in an unsupervised fashion, how to embed similar descriptions to similar regions within the vector space. Embedding module 110 may also learn how to embed unrelated descriptions to separate regions within the vector space.

Figure 3:
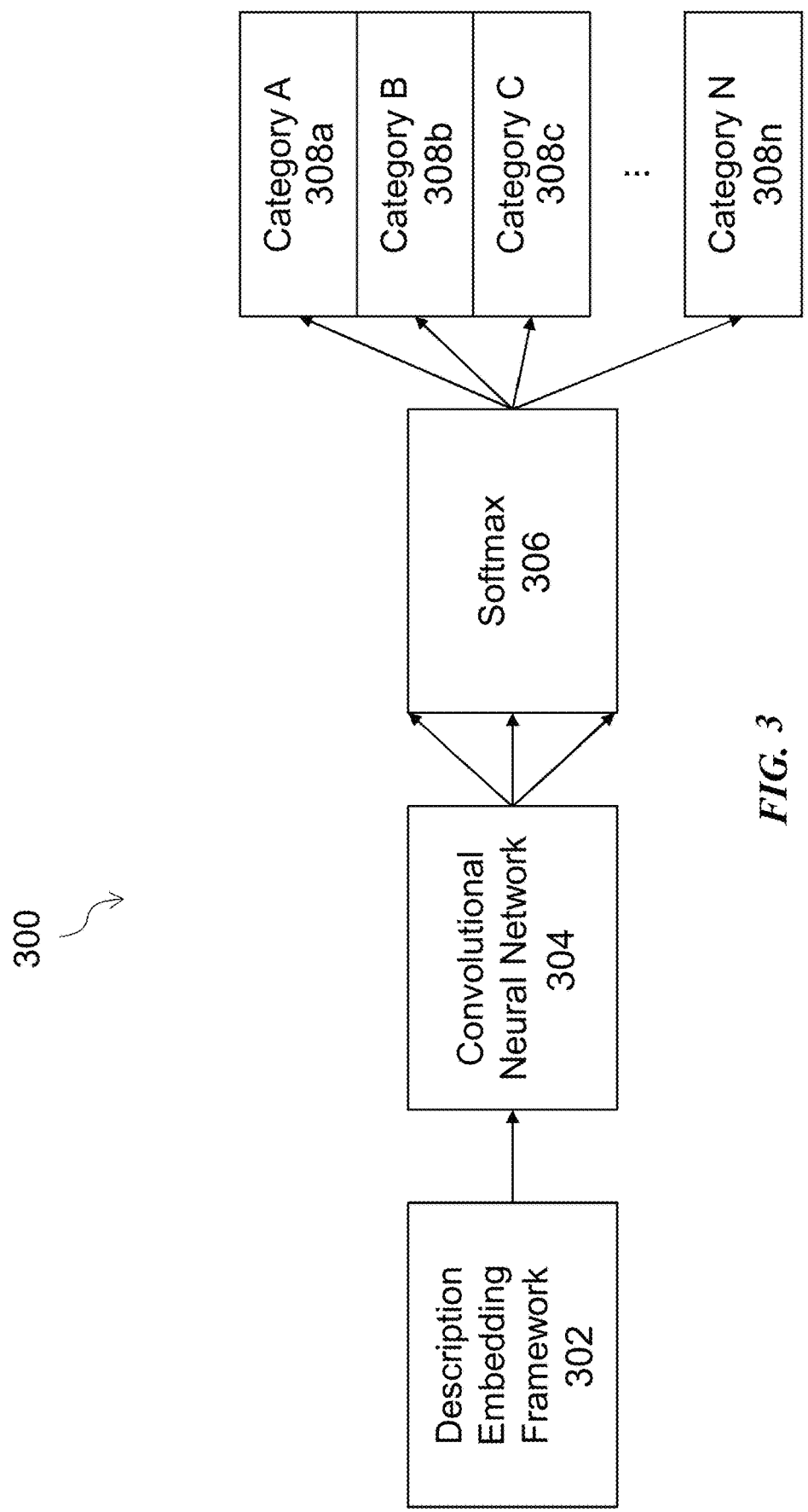
FIG. 3 is an example framework for training a supervised learning mode, according to an embodiment of the present disclosure.

FIG. 3 is an example framework 300 for training a supervised learning mode, according to an embodiment of the present disclosure. In some embodiments, framework 300 may be used within the context of FIG. 2. Framework 300 may include a description embedding framework 302, a convolutional neural network 304, a softmax function 306, and/or a plurality of categories 308*a-n*. In some embodiments, there may be sixteen categories. For example, description embedding framework 302 may be used to embed business descriptions to a vector space as described above for block 204. In some embodiments, description embedding framework 302 may also be tunable and may be adjusted, as described above for block 208. In some embodiments, training a supervised learning model as described above for block 206 may include training convolutional neural network 304. Convolutional neural network 304 may predict a business category for embedded descriptions and the softmax function 306 may map these predictions to a probability. The softmax function 306 may map arbitrary numbers into probabilities that may, in turn, correspond to each category. For example, a business description may be processed by framework 300 and the convolutional neural network 304 and softmax function 306 may output a prediction that there is a 9% likelihood the description corresponds to category A, a 3% likelihood the description corresponds to category B, a 1% likelihood the description corresponds to category C, and an 87% likelihood the description corresponds to category N.

Figure 4:
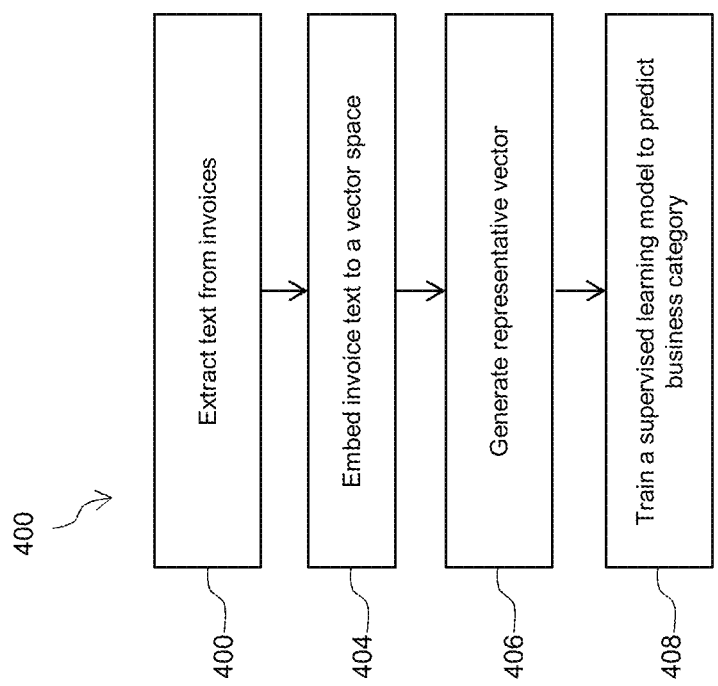
FIG. 4 is a flow diagram showing processing that may occur within the system of FIG. 1, according to an embodiment of the present disclosure.

FIG. 4 is a flow diagram showing a process 400 that may occur within the system 100 of FIG. 1, according to an embodiment of the present disclosure. In some embodiments, process 400 may be used to train a supervised learning model to predict a business' category (e.g., classify/categorize a business) based on analyzing the business' vendors. In some embodiments, process 400 may be used to train a supervised learning model to predict a description of a business based on the business' vendors. At block 402, invoice preparation module 118 of system 100 may extract text from a plurality of invoices. In some embodiments, invoice preparation module 118 may extract text from all invoices within database 122 (e.g., the invoices for all businesses relayed to the vendors/users that are registered with accounting software). In some embodiments, invoice preparation module 118 may only extract text from invoices of businesses that are received from a vendor. Invoice preparation module 118 may utilize various standard techniques for extracting the invoice text and maintaining it in structured format, such as optical character recognition (OCR) techniques. In some embodiments, the format of the extracted text may retain the structure of the original invoice. An invoice may have a number of line items (e.g., a list of numbered transactions, each one including a description of the product/service, a price, a vendor, a location, etc.).

At block 404, embedding module 110 may embed the extracted text from each invoice to a vector within a vector space. In some embodiments, embedding module 110 may use a word2vec algorithm, in a manner similar to or the same as described above. Embedding module may apply a word2vec algorithm using a CBOW approach to generate a vector representation of the extracted text. In some embodiments, the vector representation may be a three hundred-dimensional vector. The vector representation of the text may be a single vector generated by averaging the vector representation of each word in the text. In some embodiments, the vector representation of the text may be a matrix with each column vector being a vector of a word of the text. In some embodiments, embedding module 110 may embed each line item of an invoice separately, generating a plurality of line item vectors for each invoice.

At block 406, embedding module 110 may generate a representative vector for a vendor based on its associated invoices that were processed in blocks 402 and 404. For example, invoice preparation module 118 may recognize a plurality of invoices from a specific vendor, Vendor A, and may generate a single vector representing Vendor A based on these invoices. After extracting the text (block 402) from each invoice associated with Vendor A, embedding module 110 may, as described in relation to block 404, embed the text of each line item of each invoice to a vector. In some embodiments, generating a representative vector for Vendor A may include analysis and processing of the plurality of vectors for each line item of each invoice of Vendor A. Invoice preparation module 118 may combine words (in vector format or in the vector space) within each line item using a long short-term memory (LSTM) layer. In some embodiments, this may reduce redundancy and improve efficiency and accuracy of downstream processing. Invoice preparation module 118 may also utilize a convolutional neural network to combine line item vectors within the same invoice to create a vector representing that invoice. In some embodiments, the convolutional neural network may be configured to add or subtract the plurality of line item vectors with various weights to create a single vector representing the invoice. Invoice preparation module 118 may then combine all invoice vectors associated with Vendor A to generate a vector representing Vendor A. In some embodiments, this may include averaging every invoice vector associated with Vendor A.

At block 408, a supervised learning model may be trained to predict a business' category or reduced space description based on the vendor vector generated at block 406. The model may be trained by providing a plurality of example pairs of business vectors and vendor vectors; these example pairs may be labeled and may be referred to as "training data" that the neural network uses to "learn." In some embodiments, a softmax layer may also be trained to map each prediction to a probability, such as softmax function 510 of FIG. 5. The model may learn to weigh all components of the business vector to make a prediction. In some embodiments, the model may be contained in the categorization module 114 of system 100. In some embodiments, invoice preparation module 118 may also be configured to obtain additional relational data related to the vendor from the database 122 and send the relational data to embedding module 110 to be embedded into invoice vectors or the vendor vector. Relational data may include percentiles of transaction amounts, frequencies of different range of transaction amount values, etc. In some embodiments, bank transactions may also be obtained by invoice preparation module 110 and blocks 402 and 404 may apply to the bank transactions. In the case where bank transaction vectors are also created, at block 406, the vector representing the vendor may take into account bank transaction vectors along with invoice vectors. In some embodiments, text preparation module 108 may dean up the extracted before embedding module 110 embeds the text to a vector space (block 404).

Figure 5:
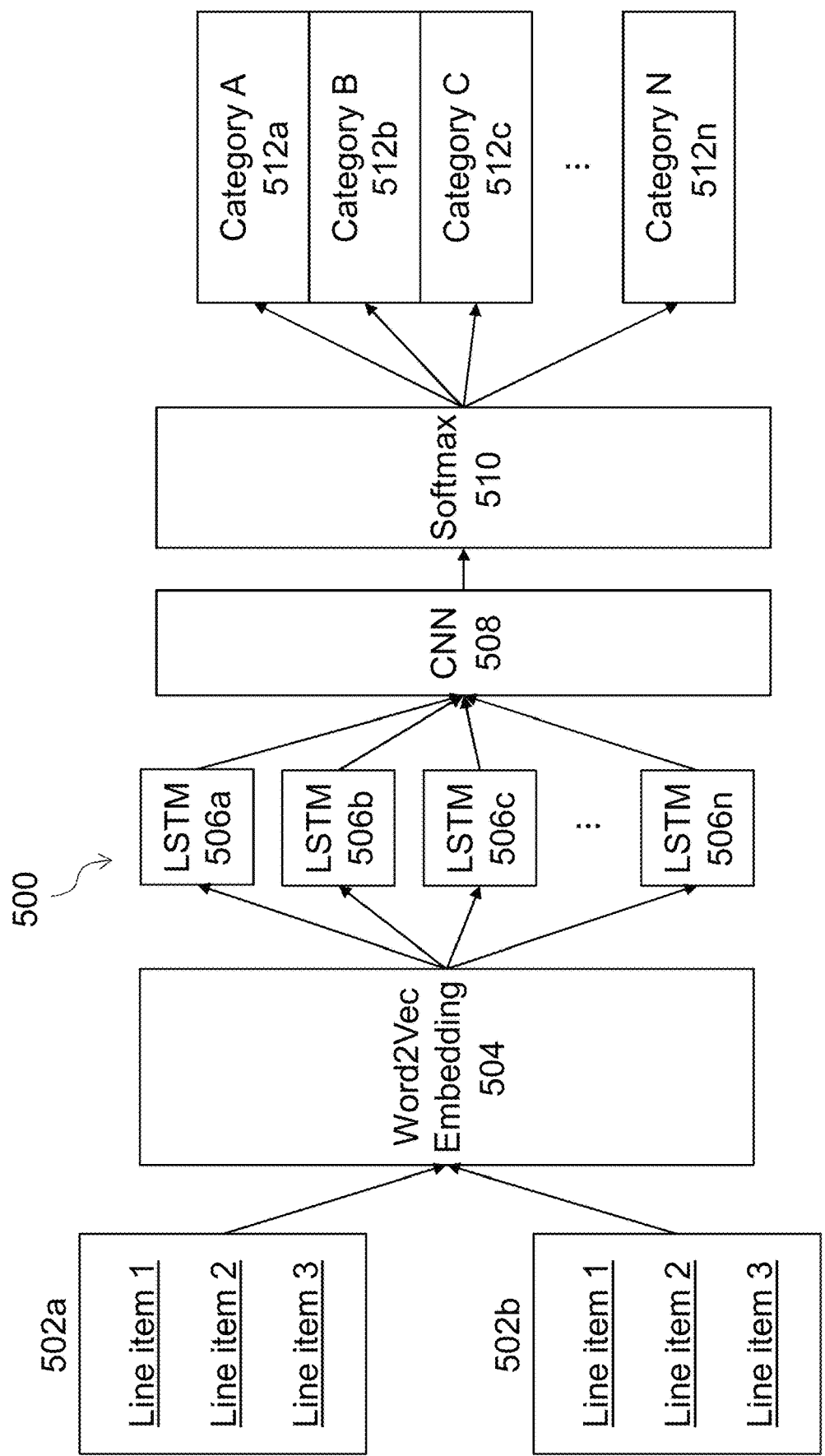
FIG. 5 is another example framework for training a supervised learning model, according to an embodiment of the present disclosure.

FIG. 5 illustrates another example framework 500 for training a supervised learning model, according to an embodiment of the present disclosure. In some embodiments, framework 500 may be the supervised learning model that is trained according to the process 400 of FIG. 4. Framework 500 may input a plurality of invoices 502a, 502b, Framework 500 is not limited to two invoices and may analyze a large number of invoices associated with many users or vendors within the software environment. Invoice 502a includes three-line items as an example, although typical invoices may include any number of line items. Text extraction modules or processes are not shown in FIG. 5. The invoices 502 and associated line items move to the word2vec embedding 504, where each line item may be converted into a vector format. The LSTM layers 506a-n combine words within single line items for the invoices in the vector space. In some embodiments, the LSTM layers 506a-n may be encompassed in a single LSTM layer. Convolutional neural network (CNN) 508 may receive the plurality of line item vectors, combine them into a single vector representing each invoice, and combine the vectors representing each invoice associated with a vendor into a single vector representing the vendor, as described above for block 406. The CNN 508 may also be trained to categorize a business based on the vendor vector it generates, as described above for block 408. In some embodiments, framework 500 may include a softmax function 510 to smooth the predictions from the CNN 508. This may include mapping each prediction to a probability associated with the output categories 512a-n.

Figure 6:
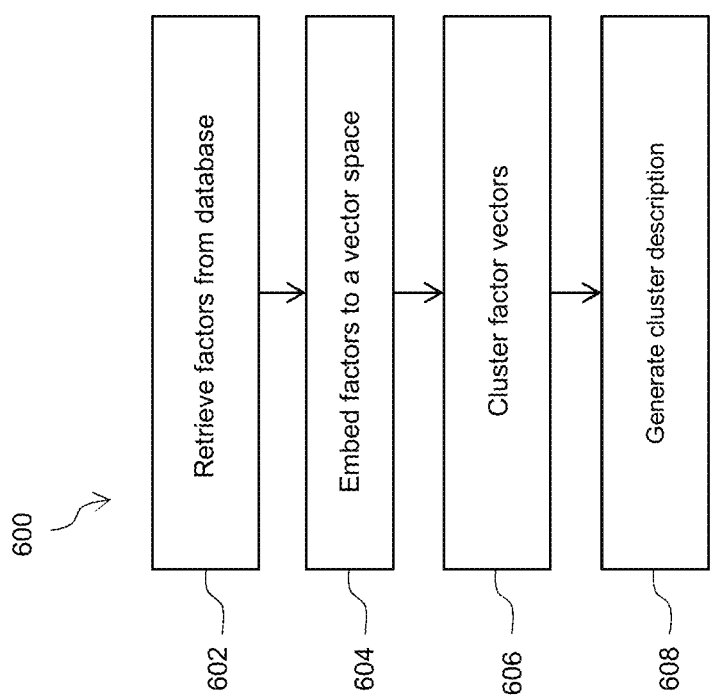
FIG. 6 is a flow diagram showing processing that may occur within the system of FIG. 1, according to an embodiment of the present disclosure.

FIG. 6 is a flow diagram showing a process 600 that may occur within the system 100 of FIG. 1, according to an embodiment of the present disclosure. In some embodiments, process 600 may be used to generate a list of factors associated with businesses registered with a business accounting software. The factors associated with the business' success may be related to the products and/or services offered by the business and the format of which those products and/or services are offered by the business. The factors may also be related to the products and/or services purchased by the business from a vendor and the format of which those products and/or services are purchased from the vendor. At block 602, retrieved according to standard text extraction techniques including, but not limited to, OCR techniques. In one embodiment, the factors may be all factors associated with users or businesses of accounting software stored in database 122.

At block 604, embedding module 110 may embed the retrieved factors to a vector space. In some embodiments, the processing of block 604 may include some operations similar to or the same as described in relation to embedding module 110 in the context of FIG. 1. Embedding module may apply a word2vec algorithm using a CBOW approach to generate a vector representation of the business factors. In some embodiments, the vector representation may be a three hundred-dimensional vector. The vector representation of the business factor may be a single vector generated by averaging the vector representation of each word in the list of factors. In some embodiments, the vector representation of the business factors may be a matrix with each column vector being a vector of a word in the list of factors. In some embodiments, block 604 may also include utilizing an LSTM layer to combine words, in the vector format, within the same line item. In some embodiments, text preparation module 108 may clean up the extracted text before embedding module 110 embeds the text to a vector space (block 604).

At block 606, clustering module 112 may cluster the plurality of factor vectors. In some embodiments, the clustering module 112 may cluster vectors received from a word2vec embedding followed by an LSTM layer, such as in framework 500. In some embodiments, clustering module 112 may form clusters in the vector space based on the factor vectors according to a mean-shift clustering algorithm.

At block 608, cluster analysis module 116 may generate a cluster description for each cluster. In some embodiments, cluster analysis module 116 may analyze the text corresponding to each line item vector within a cluster. Cluster analysis module 116 may calculate a TFIDF value for each word within the cluster. In some embodiments, the TFIDF value may be calculated in relation to the entire cluster, as opposed to the TFIDF value being calculated in relation to the line item that contains the word. Cluster analysis module 116 may identify the highest scoring words and combine them to generate a representative description of the cluster. In some embodiments, cluster analysis module 116 may choose a pre-defined number of top scoring words, such as the top five or ten words with the highest score. In some embodiments, cluster analysis module 116 may select all words with a TFIDF value above a certain pre-defined threshold (e.g., 0.75). In some embodiments, performing process 600 on the factors stored in the database 122 may allow for a standardized and more accurate list of factors that are associated with a business' success to be accounted for within accounting software environment.

Figure 7:
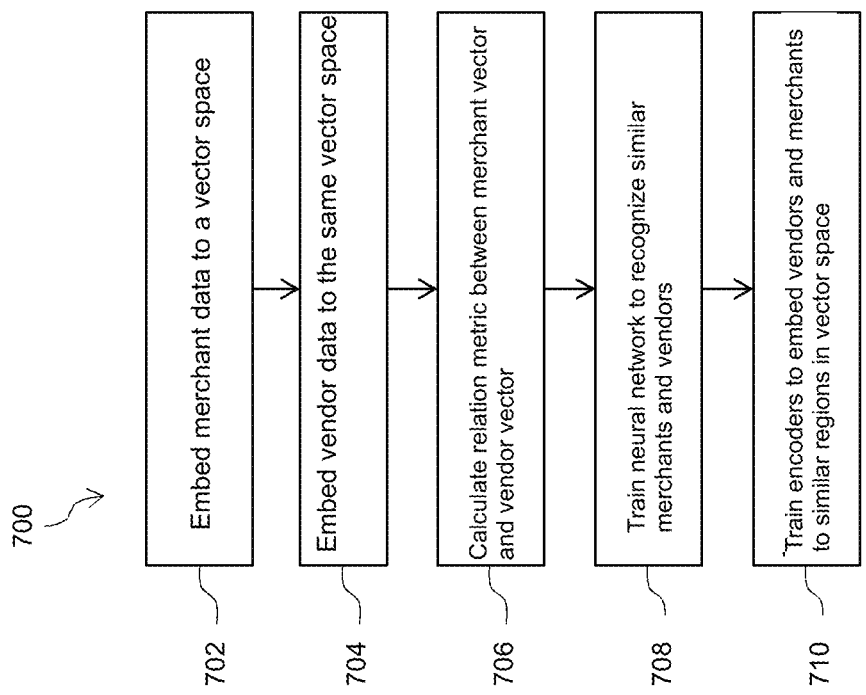
FIG. 7 is a flow diagram showing processing that may occur within the system of FIG. 1, according to an embodiment of the present disclosure.

FIG. 7 is a flow diagram showing a process 700 that may occur within the system 100 of FIG. 1, according to an embodiment of the present disclosure. In some embodiments, process 700 may be used to train a neural network and encoder architecture to recognize related pairs of merchants and vendors. At block 702, embedding module 110 may embed merchant data to a vector space. In some embodiments, merchant data may include a business category or description, a business ID (identification), and other characteristics such as a geographic location. Embedding module 110 may convert the merchant data to vector format in a vector space using an encoder.

At block 704, embedding module 110 may embed vendor data from invoices associated with the merchant to the same vector space. In some embodiments, embedding module 110 may use a second encoder for embedding vendor data. The second encoder may also apply a word2vec algorithm, although it may be a separate algorithm from the one used to embed the business data in block 702. In other words, the two encoders may utilize word2vec algorithms with separate sets of parameters that may each be separately tunable according to the learning process. In some embodiments, the embedding that encodes the vendor data to a vector space may encode, for example, the text, amounts, and other info contained in an invoice. In some embodiments, the second encoder may also embed each line item of the invoice separately and combine the line item vectors to create a representative vector for the vendor.

Blocks 702 and 704 may operate in a manner similar to or the same as described in relation to embedding module 110 in the context of FIG. 1. Embedding module may apply a word2vec algorithm using a CBOW approach to generate a vector representation of the merchant/vendor data. In some embodiments, the vector representation may be a three hundred-dimensional vector. The vector representation of the merchant/vendor data may be a single vector generated by averaging the vector representation of each word in the merchant/vendor data. In some embodiments, the vector representation of the merchant/vendor data may be a matrix with each column vector being a vector of a word in the merchant/vendor data. In some embodiments, text preparation module 108 may clean up the merchant data before embedding module 110 embeds the text to a vector space (block 704).

At block 706, relation metric calculator 120 may calculate a relation metric between the merchant vector and the vendor vector. In some embodiments, the relation metric may be calculated by calculating an inner product between the two vectors. In some embodiments, the relation metric may be calculated by multiplying the inner product by a sigmoid function, keeping the metric between zero and one.

At block 708, a neural network may be trained to recognize whether merchants and vendors are related based on the relation metric calculated between the two. In some embodiments, the neural network may be trained in an end-to-end fashion. In some embodiments, training the neural network may include providing a plurality of related merchant-vendor pairs and associated relation metrics and unrelated merchant-vendor pairs and associated relation metrics. The neural network may learn to predict whether merchant-vendor pairs are related based on the relation metric calculated between the two and adjust the parameters of the sigmoid function.

At block 710, the encoders are trained to embed vendor and merchant data, respectively, to similar regions in the vector space. The encoders may learn, based on the provided positive and negative samples, how to embed similar merchants to the same regions and similar vendors to the same region, and vice versa. This may be a benefit of training the network in an end-to-end fashion; back-propagation may help both ends of the network learn (e.g., both the prediction portion and the encoding portion). Back-propagation algorithms may include gradient-based learning processes for training multilayer networks. Back-propagation algorithms may include computing gradients of a loss function with respect to each weight in a layer, wherein the weights within each layer are tuned to generate accurate predictions. In some embodiments, the weights may be used within the neural network architecture to embed text to vector spaces and to make other prediction as discussed herein. In some embodiments, end-to-end training may include iterative forward and backward propagation to jointly train the entire network architecture. The same region may include a region compact enough such that the vectors within the region, when used to calculate a relation metric, are determined to be related. The encoders may learn to embed unrelated vendors and merchants data to different regions in the vector space. Different regions may include regions that are far enough apart such that a relation metric calculated between each region would yield a determination that they are unrelated.

Figure 8:
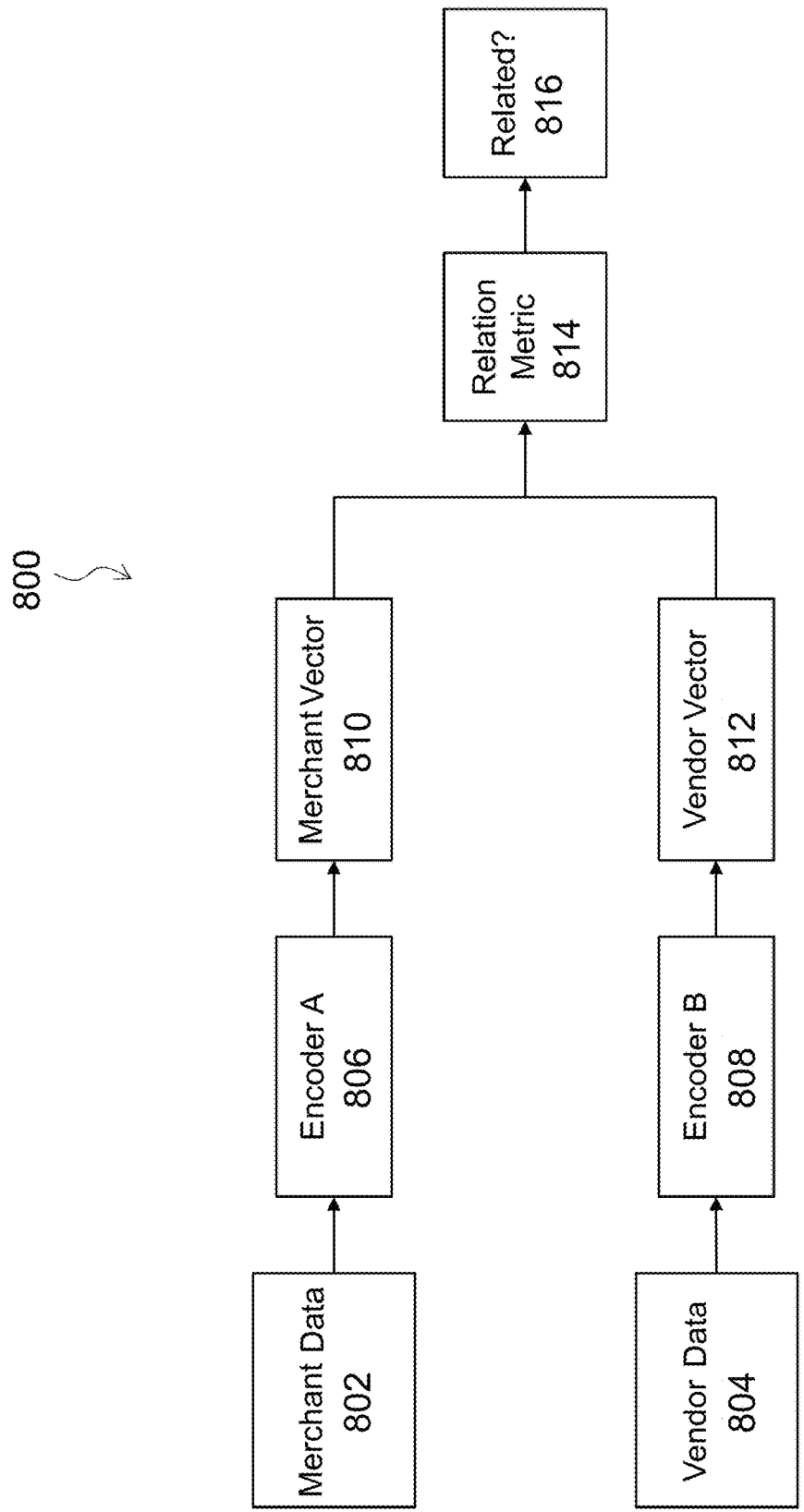
FIG. 8 is an example framework for training a model, according to an embodiment of the present disclosure.

FIG. 8 illustrates an example framework 800 for training a model, according to an embodiment of the present disclosure. Framework 800 may be a visualization of the framework that may apply process 700 to train a network architecture. In framework 800, inputs may include merchant data 802 and vendor data 804. Merchant data 802 may include data such as business categories, business descriptions, business IDs, geographic locations, etc. Merchant data 802 may be obtained from a database that stores information for users or businesses of accounting software, such as database 122. Vendor data 804 may include vendor categories, vendor descriptions, vendor IDs, geographic locations, etc. Vendor data 804 may be stored in database 122 associated with merchants or users of the accounting software. In some embodiments, for training the network, each supplied pair of business data 802 and 804 may include an indication of whether the pair is related or unrelated. In some embodiments, the indication may be a binary number, such as zero (corresponding to unrelated) and one (corresponding to related).

Encoder A 806 may be configured to embed the merchant data 802 to a vector space, creating business vector 810, In some embodiments, encoder 806 may apply a trained word2vec algorithm such as described in relation to block 704 of FIG. 7. Encoder B 808 may be configured embed the vendor data 804 to a vector space, creating vendor vector 812. In some embodiments, encoder 808 may apply a trained word2vec algorithm such as described in relation to block 704. In some embodiments, encoders 806 and 808 may contain separate word2vec algorithms. In other words, encoders 806 and 808 may include word2vec algorithms with separate and distinct sets of parameters. Each encoder may be separately tunable to take advantage of the end-to-end learning fashion applied in process 700. Both encoders may include a neural network for performing the vector space embedding. At the relation metric block 814, a relation metric (such as the one described above for block 706) may be calculated between the merchant vector 810 and the vendor vector 812. The relation metric 814 may include an inner product between the two vectors multiplied by a sigmoid to smooth the function and limit the output to stay between zero and one. Block 816 may include neural network learning to predict whether a vendor-merchant data pair is related or unrelated based on the relation metrics 814 and the indications of related/unrelated pairs provided to the framework.

Figure 9:
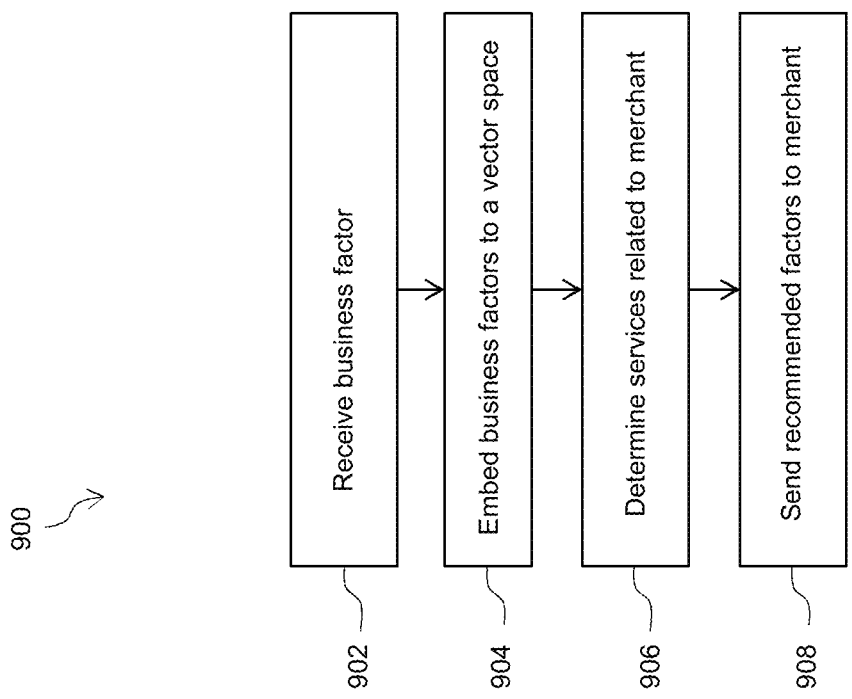
FIG. 9 is a flow diagram showing processing that may occur within the system of FIG. 1, according to an embodiment of the present disclosure.

FIG. 9 is a flow diagram showing a process 900 that may occur within the system 100 of FIG. 1, according to an embodiment of the present disclosure. Process 900 may be used to generate factor recommendations to a user or merchant registered to the accounting software. In some embodiments, process 900 may be performed in response to any user or business (whether they are new or not) requesting a list of recommended factors. For example, a request may be submitted via a user interface on user device 102 and sent to server device 106 via network 104. At block 902, embedding module 110 may receive business factor associated with a customer or merchant. In some embodiments, embedding module 110 may extract business factor from database 122.

At block 904, embedding module 110 may embed the business factor to a vector space, such as in the fashion described above for block 704. In some embodiments, block 904 may be performed with tuned encoders, such as the encoders trained in an end-to-end learning fashion in block 710. The output of block 904 may be a merchant vector. In some embodiments, text preparation module 108 may clean up the received business data before embedding module 110 embeds the text to a vector space (904).

At block 906, relation metric calculator 120 may determine services related to the merchant based on the business vector generated in block 904. Relation metric calculator 120 may calculate a relation metric between the business vector and a vendor vectors associated with other businesses that are contained within the vector space. In some embodiments, the vendor vectors may include all vendor vectors associated with all other businesses that are registered with the accounting software and stored in database 122. In some embodiments, the vendor vectors for which relation metrics are calculated may include only vendors associated with businesses within the same category, location, or the like. Relation metric calculator 120 may then determine vendors that are related to the business based on the plurality of relation metrics by analyzing the calculated relation metrics with the neural network trained in FIGS. 7 and 8. The neural network may generate predictions for the plurality of relation metrics calculated by relation metric calculator 120.

In response to determining factors related to the business, at block 908, server device 106 may send the recommended factors to the customer (e.g., to a user device 102 associated with the customer). In some embodiments, for each vendor vector determined to be related to the business with the neural network at block 906, server device 106 may extract text or other data from the actual vendor associated with the vendor vector and send the extracted text or other data to the user device 102. In some embodiments, the text or other data may be anonymized so as to preserve anonymity of the business associated with the related vendor.

The embodiments described herein may improve the technical functioning of computer data storage systems. For example, some embodiments may reduce the amount of data required to be stored by consolidating portions of the data having similar meanings. Some embodiments may also improve data storage system functionality by improving data search speed and accuracy due to improved classification of data within the storage system.

Figure 10:
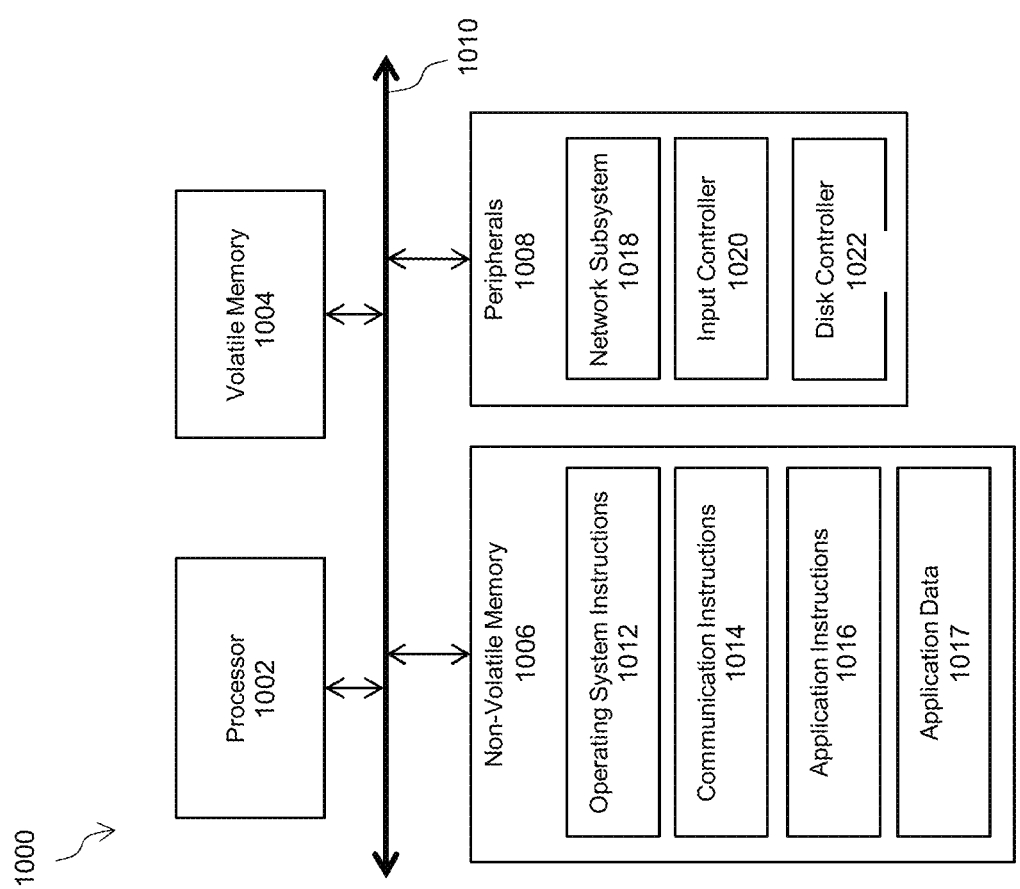
FIG. 10 is an example server device that may be used within the system of FIG. 1, according to an embodiment of the present disclosure.

FIG. 10 is a diagram of an example server device 1000 that may be used within system 100 of FIG. 1. Server device 1000 may implement various features and processes as described herein. Server device 1000 may be implemented on any electronic device that runs software applications derived from complied instructions, including without limitation personal computers, servers, smart phones, media players, electronic tablets, game consoles, email devices, etc. In some implementations, server device 1000 may include one or more processors 1002, volatile memory 1004, non-volatile memory 1006, and one or more peripherals 1008. These components may be interconnected by one or more computer buses 1010.

Processor(s) 1002 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 1010 may be any known internal or external bus technology, including but not limited to ISA, EISA, PCI, PCI Express, USB, Serial ATA, or FireWire. Volatile memory 1004 may include, for example, SDRAM. Processor 1002 may receive instructions and data from a read-only memory or a random access memory or both. Essential elements of a computer may include a processor for executing instructions and one or more memories for storing instructions and data.

Non-volatile memory 1006 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1006 may store various computer instructions including operating system instructions 1012, communication instructions 1014, application instructions 1016, and application data 1017. Operating system instructions 1012 may include instructions for implementing an operating system (e.g., Mac OS®, Windows®, or Linux). The operating system may be multi-user, multiprocessing, multitasking, multithreading, real-time, and the like. Communication instructions 1014 may include network communications instructions, for example, software for implementing communication protocols, such as TCP/IP, HTTP, Ethernet, telephony, etc. Application instructions 1016 may include instructions for performing intelligent rolling updates on a cluster of servers according to the systems and methods disclosed herein. For example, application instructions 1016 may include instructions for components 110-112 described above in conjunction with FIG. 1. Application data 1017 may include data corresponding to 108-122 described above in conjunction with FIG. 1.

Peripherals 1008 may be included within server device 1000 or operatively coupled to communicate with server device 1000. Peripherals 1008 may include, for example, network subsystem 1018, input controller 1020, and disk controller 1022. Network subsystem 1018 may include, for example, an Ethernet of WiFi adapter. Input controller 1020 may be any known input device technology, including but not limited to a keyboard (including a virtual keyboard), mouse, track ball, and touch-sensitive pad or display. Disk controller 1022 may include one or more mass storage devices for storing data files; such devices include magnetic disks, such as internal hard disks and removable disks; magneto-optical disks; and optical disks.

Figure 11:
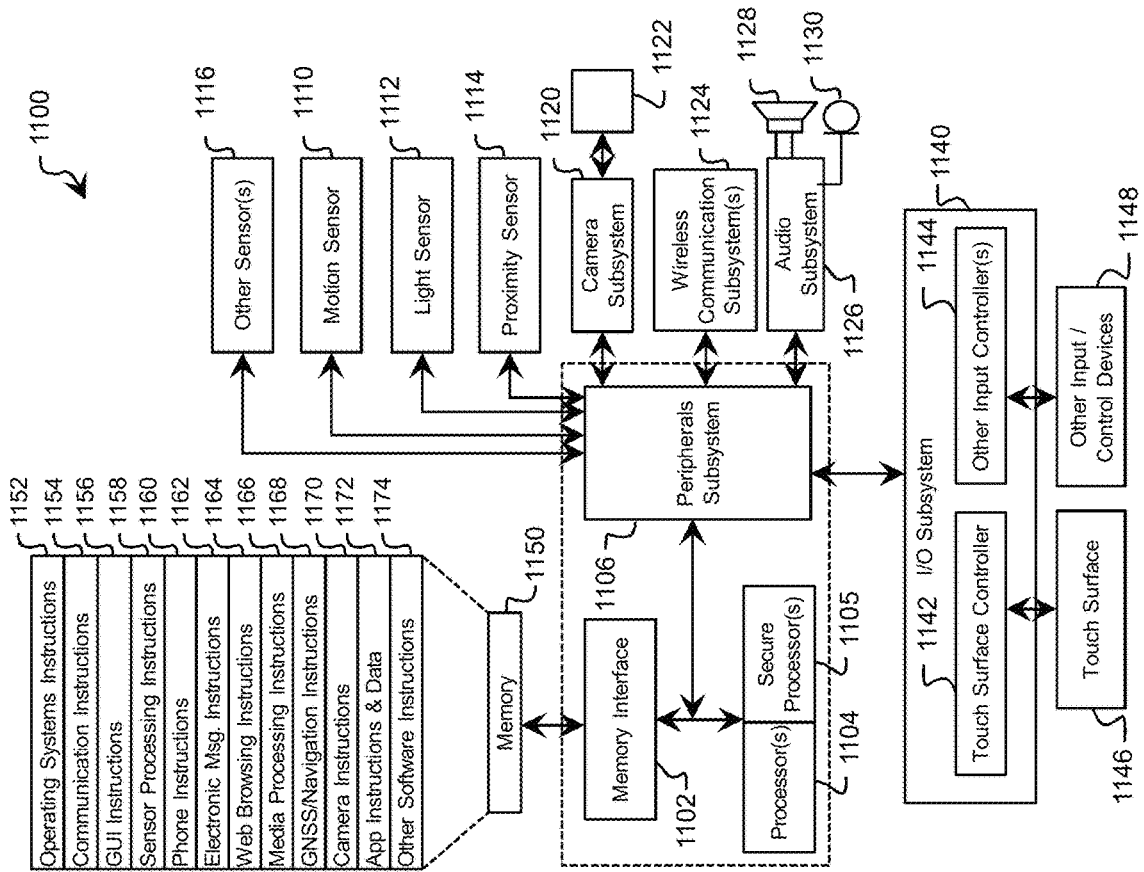
FIG. 11 is an example computing device that may be used within the system of FIG. 1, according to an embodiment of the present disclosure.

FIG. 11 is an example computing device that may be used within the system of FIG. 1, according to an embodiment of the present disclosure. In some embodiments, device 1100 may be user device 102. The illustrative user device 1100 may include a memory interface 1102, one or more data processors, image processors, central processing units 1104, and/or secure processing units 1105, and peripherals subsystem 1106. Memory interface 1102, one or more processors 1104 and/or secure processors 1105, and/or peripherals subsystem 1106 may be separate components or may be integrated in one or more integrated circuits. The various components in user device 1100 may be coupled by one or more communication buses or signal lines.

Sensors, devices, and subsystems may be coupled to peripherals subsystem 1106 to facilitate multiple functionalities. For example, motion sensor 1110, light sensor 1112, and proximity sensor 1114 may be coupled to peripherals subsystem 1106 to facilitate orientation, lighting, and proximity functions. Other sensors 1116 may also be connected to peripherals subsystem 1106, such as a global navigation satellite system (GNSS) (e.g., GPS receiver), a temperature sensor, a biometric sensor, magnetometer, or other sensing device, to facilitate related functionalities.

Camera subsystem 1120 and optical sensor 1122, e.g., a charged coupled device (CCD) or a complementary metal-oxide semiconductor (CMOS) optical sensor, may be utilized to facilitate camera functions, such as recording photographs and video clips. Camera subsystem 1120 and optical sensor 1122 may be used to collect images of a user to be used during authentication of a user, e.g., by performing facial recognition analysis.

Communication functions may be facilitated through one or more wired and/or wireless communication subsystems 1124, which may include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 1124. The specific design and implementation of communication subsystems 1124 may depend on the communication network(s) over which the user device 1100 is intended to operate. For example, user device 1100 may include communication subsystems 1124 designed to operate over a GSM network, a GPRS network, an EDGE network, a WiFi or WiMax network, and a Bluetooth™ network. For example, wireless communication subsystems 1124 may include hosting protocols such that device 1100 may be configured as a base station for other wireless devices and/or to provide a WiFi service.

Audio subsystem 1126 may be coupled to speaker 1128 and microphone 1130 to facilitate voice-enabled functions, such as speaker recognition, voice replication, digital recording, and telephony functions. Audio subsystem 1126 may be configured to facilitate processing voice commands, voice-printing, and voice authentication, for example.

I/O subsystem 1140 may include a touch-surface controller 1142 and/or other input controller(s) 1144. Touch-surface controller 1142 may be coupled to a touch surface 1146. Touch-surface 1146 and touch-surface controller 1142 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1146.

The other input controller(s) 1144 may be coupled to other input/control devices 1148, such as one or more buttons, rocker switches, thumb-wheel, infrared port, USB port, and/or a pointer device such as a stylus. The one or more buttons (not shown) may include an up/down button for volume control of speaker 1128 and/or microphone 1130.

In some implementations, a pressing of the button for a first duration may disengage a lock of touch-surface 1146; and a pressing of the button for a second duration that is longer than the first duration may turn power to user device 1100 on or off. Pressing the button for a third duration may activate a voice control, or voice command, module that enables the user to speak commands into microphone 1130 to cause the device to execute the spoken command. The user may customize a functionality of one or more of the buttons. Touch-surface 1146 may, for example, also be used to implement virtual or soft buttons and/or a keyboard.

In some implementations, user device 1100 may present recorded audio and/or video files, such as MP3, AAC, and MPEG files. In some implementations, user device 1100 may include the functionality of an MP3 player, such as an iPod™. User device 1100 may, therefore, include a 36-pin connector and/or 8-pin connector that is compatible with the iPod. Other input/output and control devices may also be used.

Memory interface 1102 may be coupled to memory 1150. Memory 1150 may include high-speed random access memory and/or non-volatile memory, such as one or more magnetic disk storage devices, one or more optical storage devices, and/or flash memory (e.g., NAND, NOR). Memory 1150 may store an operating system 1152, such as Darwin, RTXC, LINUX, UNIX, OS X, Windows, or an embedded operating system such as VxWorks.

Operating system 1152 may include instructions for handling basic system services and for performing hardware dependent tasks. In some implementations, operating system 1152 may be a kernel (e.g., UNIX kernel). In some implementations, operating system 1152 may include instructions for performing voice authentication.

Memory 1150 may also store communication instructions 1154 to facilitate communicating with one or more additional devices, one or more computers and/or one or more servers. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic messaging-related process and functions; web browsing instructions 1164 to facilitate web browsing-related processes and functions; media processing instructions 1166 to facilitate media processing-related functions and processes; GNSS/Navigation instructions 1168 to facilitate GNSS and navigation-related processes and instructions; and/or camera instructions 1170 to facilitate camera-related processes and functions.

Memory 1150 may store application (or "app") instructions and data 1172, such as instructions for the apps described above in the context of FIGS. 1-9. Memory 1150 may also store other software instructions 1174 for various other software applications in place on device 1100.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for recommending business factors to a merchant, said method comprising:
    training a network to identify related merchant-vendor pairs by:
        embedding, by a first encoder, a plurality of merchant descriptions to a vector space to obtain a plurality of merchant vectors, each merchant description corresponding to a vendor;
        embedding, by a second encoder, each corresponding vendor to the vector space to obtain a plurality of vendor vectors;
        calculating a relation metric for each description-vendor pair;
        training a neural network with the description-vendor pairs and the corresponding relation metrics to predict whether a new vendor and a new merchant description are related;
        training the first encoder to embed related merchant descriptions to similar regions in the vector space; and
        training the second encoder to embed related vendors to the similar regions in the vector space;
    receiving a request for recommended business factors from a device;
    receiving merchant data associated with a merchant from the device, the merchant data comprising vendor data associated with the merchant;
    embedding the merchant data to a vector space to obtain a merchant vector, the vector space comprising a plurality of other vectors associated with other merchants;
    calculating, using the trained network, a relation metric between the merchant vector and a vector of the plurality of other vectors, the vector being associated with a second merchant, the relation metric representing a degree of relation between the merchant and the second merchant;
    determining that the relation metric is above a pre-defined threshold value; and
    when it is determined that the relation metric is above the pre-defined threshold value, sending merchant data associated with the second merchant to the device, the merchant data associated with the second merchant comprising business factors associated with the second merchant.

2. The method of claim 1, wherein embedding the merchant data to the vector space comprises:
   detecting stop words in the merchant data associated with the merchant from a pre-defined list of stop words;
   removing the detected stop words from the merchant data associated with the merchant;
   lemmatizing the merchant data associated with the merchant; and
   embedding the lemmatized merchant data to the vector space.

3. The method of claim 2, wherein embedding the merchant data to the vector space further comprises:
   calculating a term frequency-inverse document frequency (TFIDF) value for each word of the lemmatized merchant data;
   ranking the calculated TFIDF values;
   identifying a top pre-defined number of words with a highest rank; and
   embedding the identified words to obtain the merchant vector.

4. The method of claim 2, wherein embedding the merchant data to the vector space further comprises:
   calculating a term frequency-inverse document frequency (TFIDF) value for each word of the lemmatized merchant data;
   identifying a pre-defined number of words with TFIDF values above a certain threshold; and
   embedding the identified words to obtain the merchant vector.

5. The method of claim 1, wherein embedding the merchant data to the vector space further comprises:
   applying a word2vec model, the applying comprising:
      creating a bag-of-words representing the merchant data, the bag-of-words including each word in the merchant data and an associated multiplicity of each word; and
      converting each word in the merchant data into a vector based on the bag-of-words and not based on grammar and word order.

6. The method of claim 1, wherein calculating the relation metric comprises calculating an inner product between the merchant vector and the vector of the plurality of other vectors.

7. The method of claim 6, further comprising using a sigmoid function on the inner product to keep the relation metric between zero and one, wherein a one corresponds to a related pair of vectors and a zero corresponds to an unrelated pair of vectors.

8. The method of claim 7, further comprising:
   embedding related merchant descriptions to similar regions in a vector space; and
   embedding unrelated business descriptions to different regions in a vector space.

9. The method of claim 1, further comprising training the neural network, the first encoder, and the second encoder jointly in an end-to-end process, the process including:
   receiving a plurality of description-vendor pairs and a plurality of relation metrics as labelled training data, each description-vendor pair including an associated relation metric and a label indicating whether the description-vendor pair is related; and
   applying a back-propagation algorithm to train each of the neural network, the first encoder, and the second encoder based on the received description-vendor pairs and associated relation metrics.

10. The method of claim 1, further comprising:
    detecting stop words in the plurality of merchant descriptions from a pre-defined list of stop words;
    removing the detected stop words from the plurality of merchant descriptions;
    lemmatizing the plurality of merchant descriptions to obtain lemmatized merchant descriptions; and
    embedding, by the first encoder, the lemmatized merchant descriptions to the vector space.

11. The method of claim 10, further comprising:
    calculating a term frequency-inverse document frequency (TFIDF) value for each word of each lemmatized merchant description;
    ranking the calculated TFIDF values;
    identifying a top pre-defined number of words with a highest rank; and
    embedding, by the first encoder, the identified words to obtain the merchant vector.

12. The method of claim 10, further comprising:
    calculating a term frequency-inverse document frequency (TFIDF) value for each word of each lemmatized merchant description;
    identifying a pre-defined number of words with TFIDF values above a certain threshold; and
    embedding, by the first encoder, the identified words to obtain the merchant vector.

13. The method of claim 1, wherein embedding, by the second encoder, each corresponding vendor to the vector space comprises:
    embedding each word of each line item of an invoice to create a plurality of word vectors for each line item;
    feeding the plurality of word vectors for each line item to a long short-term memory (LSTM) layer;
    combining, via the LSTM layer, the plurality of word vectors to obtain a line item vector representing each invoice line item; and
    combining, using a neural network, the plurality of line item vectors to obtain a vendor vector;
    wherein combining includes at least one of vector addition, vector subtraction, scalar multiplication, sigmoid function multiplication, or hyperbolic function multiplication.

14. The method of claim 1, wherein calculating the relation metric comprises calculating an inner product between a merchant vector and an associated vendor vector.

15. The method of claim 14, further comprising using a sigmoid function on the inner product to keep the relation metric between zero and one, wherein a one corresponds to a related pair of vectors and a zero corresponds to an unrelated pair of vectors.

16. A system for recommending business factors to a merchant, said system comprising:
    a network trained to identify related merchant-vendor pairs by:
       embedding, by a first encoder, a plurality of merchant descriptions to a vector space to obtain a plurality of merchant vectors, each merchant description corresponding to a vendor;
       embedding, by a second encoder, each corresponding vendor to the vector space to obtain a plurality of vendor vectors;
       calculating a relation metric for each description-vendor pair;

training a neural network with the description-vendor pairs and the corresponding relation metrics to predict whether a new vendor and a new merchant description are related;

training the first encoder to embed related merchant descriptions to similar regions in the vector space; and training the second encoder to embed related vendors to the similar regions in the vector space;

a computing device configured to:

receive a request for recommended factors from a user device;

receive merchant data associated with a merchant from the user device, the merchant data comprising vendor data associated with the merchant;

embed the merchant data to a vector space to obtain a merchant vector, the vector space comprising a plurality of other vectors associated with other merchants;

calculate, using the trained network, a relation metric between the merchant vector and a vector of the plurality of other vectors, the vector being associated with a second merchant, the relation metric representing a relation between the merchant and the second merchant;

analyze the relation metric with a neural network trained to determine whether the merchant vector and the vector of the plurality of other vectors are related; and responsive to the determining, send merchant data associated with the second merchant to the user device, the merchant data associated with the second merchant comprising business factors data associated with the second business.

17. The system of claim 16, wherein the computing device is further configured to apply a word2vec model by:

creating a bag-of-words representing the merchant data associated with the merchant, the bag-of-words including each word in the merchant data associated with the merchant and an associated multiplicity of each word; and converting each word in the merchant data associated with the merchant into a vector based on the bag-of-words and not based on grammar and word order.

18. The system of claim 16, wherein sending business factors associated with the second business to the user device comprises:

identifying a vendor associated with the second business;
anonymizing business factors to create anonymized data;
removing stop words from the anonymized data;
lemmatizing the anonymized data to create lemmatized data; and
sending the lemmatized and anonymized data to the user device.

19. A computer-implemented method for recommending business factors to a merchant, said method comprising:

training a network to identify related merchant-vendor pairs by:

embedding, by a first encoder, a plurality of merchant descriptions to a vector space to obtain a plurality of merchant vectors, each merchant description corresponding to a vendor;

embedding, by a second encoder, each corresponding vendor to the vector space to obtain a plurality of vendor vectors;

calculating a relation metric for each description-vendor pair;

training a neural network with the description-vendor pairs and the corresponding relation metrics to predict whether a new vendor and a new merchant description are related;

training the first encoder to embed related merchant descriptions to similar regions in the vector space; and training the second encoder to embed related vendors to the similar regions in the vector space;

receiving a request for recommended business factors from a device;

receiving merchant data associated with a merchant from the device, the merchant data comprising vendor data associated with the merchant;

embedding the merchant data to a vector space to obtain a merchant vector by:

detecting stop words in the merchant data associated with the merchant from a pre-defined list of stop words, removing the detected stop words from the merchant data associated with the merchant, lemmatizing the merchant data associated with the merchant, and embedding the lemmatized merchant data to the vector space;

the vector space comprising a plurality of other vectors associated with other merchants;

calculating, using the trained network, a relation metric between the merchant vector and a vector of the plurality of other vectors, the vector being associated with a second merchant, the relation metric representing a degree of relation between the merchant and the second merchant;

determining that the relation metric is above a pre-defined threshold value; and when it is determined that the relation metric is above the pre-defined threshold value, sending merchant data associated with the second merchant to the device, the merchant data associated with the second merchant comprising business factors associated with the second merchant.

20. The method of claim 19, wherein embedding the merchant data to the vector space further comprises:

calculating a term frequency-inverse document frequency (TFIDF) value for each word of the lemmatized merchant data;

ranking the calculated TFIDF values;

identifying a top pre-defined number of words with a highest rank; and embedding the identified words to obtain the merchant vector.

21. The method of claim 19, wherein embedding the merchant data to the vector space further comprising:

calculating a term frequency-inverse document frequency (TFIDF) value for each word of the lemmatized merchant data;

identifying a pre-defined number of words with TFIDF values above a certain threshold; and embedding the identified words to obtain the merchant vector.

22. The method of claim 19, wherein embedding the merchant data to the vector space further comprises:

applying a word2vec model, the applying comprising:

creating a bag-of-words representing the merchant data, the bag-of-words including each word in the merchant data and an associated multiplicity of each word; and converting each word in the merchant data into a vector based on the bag-of-words and not based on grammar and word order.

23. The method of claim 19, wherein calculating the relation metric comprises calculating an inner product between the merchant vector and the vector of the plurality of other vectors.

24. The method of claim 23, further comprising using a sigmoid function on the inner product to keep the relation metric between zero and one, wherein a one corresponds to a related pair of vectors and a zero corresponds to an unrelated pair of vectors.

25. The method of claim 24, further comprising:
embedding related merchant descriptions to similar regions in a vector space; and
embedding unrelated business descriptions to different regions in a vector space.

* * * * *